July 25, 1950  J. K. CHRISTIE  2,516,677
POCKET FLIGHT POSITION INDICATOR
Filed Jan. 8, 1946  2 Sheets-Sheet 1
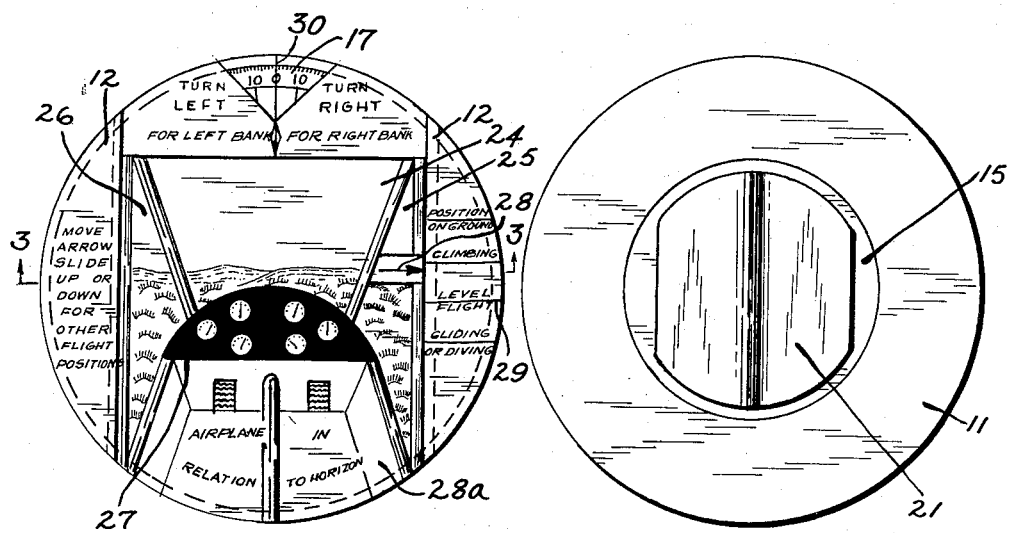
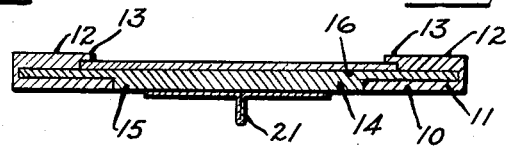
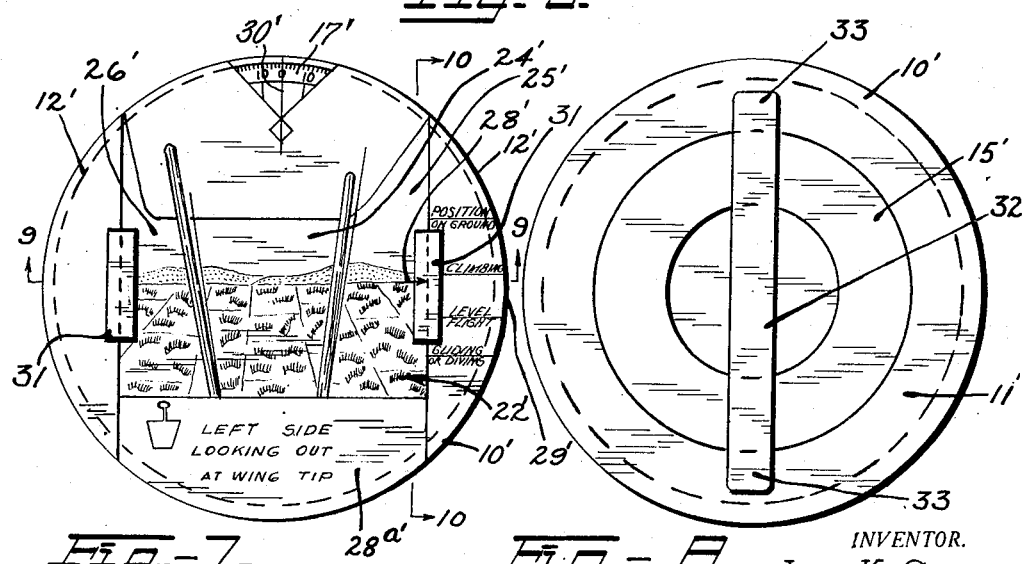
INVENTOR.
JOHN K. CHRISTIE
BY
ATTORNEY July 25, 1950 J. K. CHRISTIE 2,516,677
POCKET FLIGHT POSITION INDICATOR
Filed Jan. 8, 1946 2 Sheets-Sheet 2
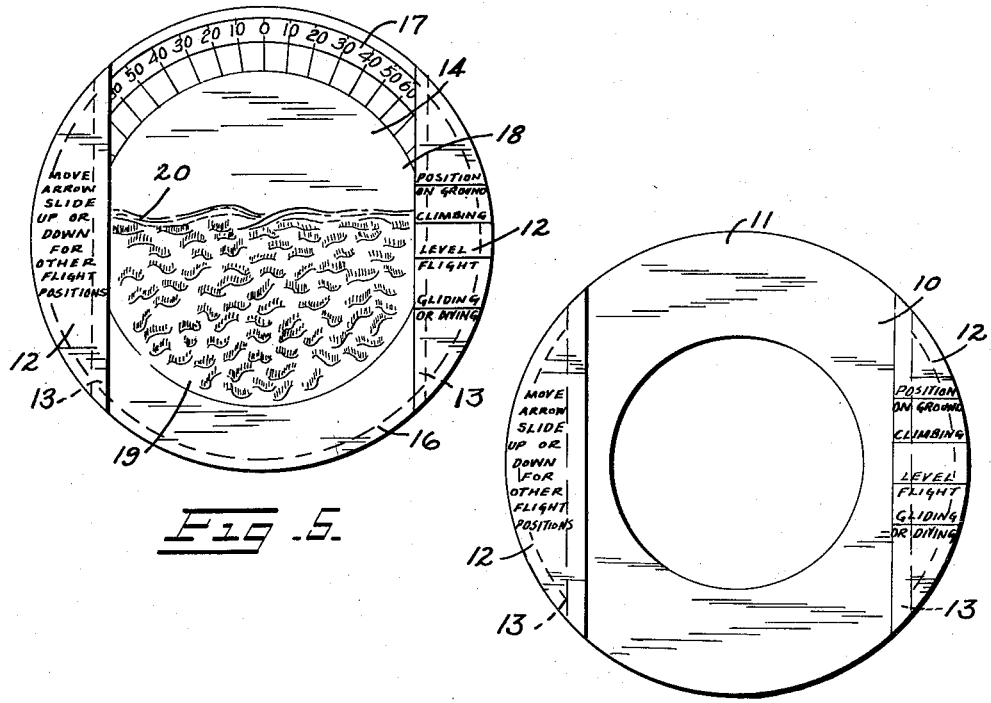
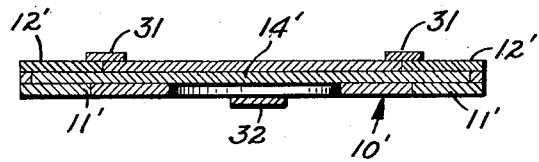
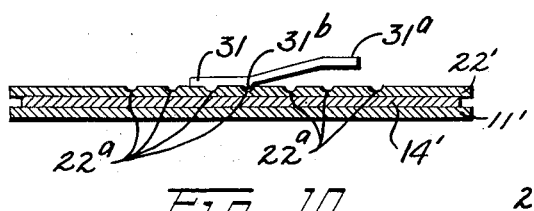
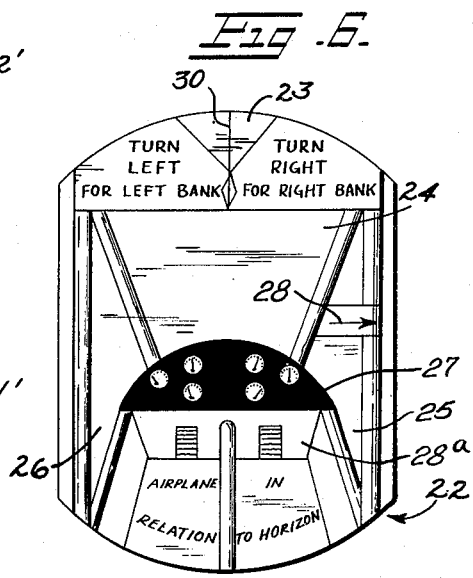
INVENTOR
JOHN K CHRISTIE
BY
ATTORNEY Patented July 25, 1950

2,516,677

UNITED STATES PATENT OFFICE 2,516,677

POCKET FLIGHT POSITION INDICATOR

John K. Christie, New City, N. Y.

Application January 8, 1946, Serial No. 639,776

4 Claims. (Cl. 35—12)

This invention relates to new and useful improvements in a pocket flight position indicator.

More specifically, the present invention proposes the construction of an indicator of the aforesaid type adapted to demonstrate positions of flight in relation to the horizon such as positions of an airplane on the ground, looking at the nose or to the front of the plane from the pilot's seat; looking from a level flight position; or from a take-off position; or during gliding, diving or climbing or movement around a lateral axis.

A further object is to provide an indicator showing the position of the plane's wing when the plane banks during a turn or movement around the longitudinal axis. The wing tip is indicated and shown in relation to the horizon from the pilot's seat illustrating such positions as level flight, climbing, gliding, diving or banking.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front view of an indicator constructed in accordance with this invention.

Fig. 2 is a rear view.

Fig. 3 is a section on the line 3—3 of Fig. 1.

Fig. 4 is a front view of a part of the indicator.

Fig. 5 is a view of the indicator with the part of Fig. 4 removed.

Fig. 6 is a view of another part of the indicator.

Fig. 7 is a front view of a wing tip indicator.

Fig. 8 is a rear view of the indicator of Fig. 7.

Fig. 9 is a section on the line 9—9 of Fig. 7.

Fig. 10 is a section on the line 10—10 of Fig. 7.

The indicator, according to this invention, includes a frame 10 (Fig. 5) consisting of a ring 11 having flanges 12 diametrically opposite, each of the flanges having a guideway 13 formed at its inner edge.

A disc 14 is mounted for rotation in the frame 10, the disc having a hub 15 in the hollow of the ring and a body 16 rotating under the flanges 12. An annular scale 17 is formed on the outer margin of the body. The body is divided substantially in half by sky 18 and land 19, their meeting forming a horizon 20. A handle 21 is secured to the rear of the hub by which the body may be rotated.

An airplane slide 22 (Fig. 4) is slidably mounted under the guides 13 of the flanges 12. This slide 22 has transparent parts 23—26, part 23 exposing the scale 17, part 24 exposing the horizon 20 and representing the transparent nose of the airplane, and parts 25 and 26 also representing transparent parts of the plane's nose.

The instrument panel 27 and interior 28a of the plane are also indicated on the slide 22. An arrow 28 is marked on one side in the part 25 for coacting with a scale 29 on the right side flange 12.

There is various captioning marked on various portions of the indicator. For instance on the interior 28a is marked "Airplane in relation to the horizon." On the right flange 12, from top to bottom is a four position scale, as follows:

Position on ground.
Climbing.
Level flight.
Gliding or diving.

Directions are written on the left flange 12 and on the slide 22 on either side of the part 23. Part 23 has a center line 30 for noting positions on the scale 17.

The operation of the device is as follows:

Normally the line 30 is at "0" and the arrow 28 is at "level flight." By moving the slide 22 upward and downwards and by turning the disc 14 to the right or to the left, various combinations of views of the land 19, sky 18 or horizon 20 may be obtained. For instance to show a student what he would see from an airplane on a 20 degree left bank, the disc 14 is turned clockwise to "20." Assuming the arrow 28 is at "level flight," the student will see through the transparent portions 24—26 what he would see if he were actually in a plane. By moving the slide 22 he can also see what a bank of 20 degrees would look like from the other three positions.

The indicator shown in Figs. 7–10 is a "wing-tip" indicator. It is essentially the same in construction as the other indicator. That is, it includes a frame 10' which distinguishes from the frame 10 in that separate pieces 31 secured to the flanges 12' take the places of the guides 13. The right piece 31 is flexible and is secured to the flange 12' at one end only and ends at its free end in a knob 31ᵃ. A tit 31ᵇ depends from the lower surface of the piece 31 and is adapted to coact with a series of recesses 22ᵃ in the slide 22'. When the slide is moved the tit moves over the row of recesses and will hold the slide against accidental movement at any desired position. By lifting the knob 31ᵃ a person can facilitate movement of the slide 22'. By pressing down on knob 31ᵃ the slide can be firmly held against movement. The tit and recesses are on the right side only, this being the side of the device usually held by a right-handed person.

Also, instead of the handle 21 the hub 15' is made annular and a strip 32 is secured thereto having extensions 33 overlapping the back of the frame 10'. The hollow interior of hub 15' enables a person to hold onto the strip 32 to rotate the disc. Other parts corresponding to like parts of the embodiment of Fig. 1 are indicated by like references with an accent added.

The indicator of Figs. 7–10 is used similarly to the indicator of Fig. 1 to give wing tip views. It shows clearly at all times the position of either a high wing tip or a low wing tip dependent upon the type of airplane as seen from the pilot's seat. Such positions as climbing, gliding or diving, rolling and level flight, are thus indicated merely by moving the slide of the indicator to correspond with the position desired.

The indicators may be made of any desired materials. It has been found that transparent plastic is a suitable material, the opaque parts being paper glued to the plastic. The separate parts of the device may each be cast of plastic in one piece or fabricated by cementing various pieces of plastic together. The present invention is an improvement of my abandoned application Serial No. 527,767, filed March 23, 1944. A feature of the present invention is that all viewing is done on one side of the indicator.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A pocket flight position indicator comprising a frame having an annular body with a concentric hole, diametrically opposite flanges overlying said body and forming guides, a disc superimposed on said frame between said body and flanges and guided by said guides for rotation relative to said frame, guideways secured to said flanges, a slide mounted on said disc and retained by said guideways against rotation with said disc, said slide having diametrical reciprocatory movement back and forth across said disc, said disc having a hub disposed in said hole, and handle means on said hub for rotating said disc whereby said slide can be moved back and forth across said disc and said disc can be rotated relative to said slide and body, said slide having thereon parts resembling parts of an airplane and said disc having thereon parts resembling a portion of the sky, a portion of the land and a horizon separating said portions, said horizon being tiltable by said disc rotation to indicate right or left banks of said airplane and said slide, by said reciprocatory movement, producing the effects of the airplane moving from level flight to the other positions including position on ground, climbing and gliding or diving.

2. A pocket flight position indicator comprising a frame having an annular body with a concentric hole, diametrically opposite flanges overlying said body and forming guides, a disc superimposed on said frame between said body and flanges and guided by said guides for rotation relative to said frame, guideways secured to said flanges, a slide mounted on said disc and retained by said guideways against rotation with said disc, said slide having diametrical reciprocatory movement back and forth across said disc, said disc having a hub disposed in said hole, and handle means on said hub for rotating said disc whereby said slide can be moved back and forth across said disc and said disc can be rotated relative to said slide and body, said slide having thereon parts resembling parts of an airplane and said disc having thereon parts resembling a portion of the sky, a portion of the land and a horizon separating said portions, said horizon being tiltable by said disc rotation to indicate right or left banks of said airplane and said slide, by said reciprocatory movement, producing the effects of the airplane moving from level flight to other positions including position on ground, climbing and gliding or diving, said airplane resembling parts being the transparent nose of an airplane with adjacent portions of the cabin and instrument board whereby a person using the indicator can produce effects similar to those seen by a pilot looking through the transparent nose.

3. A pocket flight position indicator comprising a frame having an annular body with a concentric hole, diametrically opposite flanges overlying said body and forming guides, a disc superimposed on said frame between said body and flanges and guided by said guides for rotation relative to said frame, guideways secured to said flanges, a slide mounted on said disc and retained by said guideways, said slide having diametrical reciprocatory movement back and forth across said disc, said disc having a hub disposed in said hole, and handle means on said hub for rotating said disc whereby said slide can be moved back and forth across said disc and said disc can be rotated relative to said slide, said slide having thereon parts resembling parts of an airplane, and said disc having thereon parts resembling a portion of the sky, a portion of the land and a horizon separating said portions, said horizon being tiltable by said disc rotation and said slide, by said reciprocatory movement, producing the effects of the airplane moving from level flight to other positions, including position on ground, climbing and gliding or diving, said airplane resembling parts being the wing tip of one of the airplane's wings whereby a person using the indicator can produce effects similar to those seen by a pilot looking along his wing.

4. A pocket flight position indicator comprising an annular frame provided with an annular channel disposed around a circular hole, a disc rotatably mounted in said channel and having a hub disposed in said hole, a handle on said hub for rotating said disc, said frame having a slot with parallel sides disposed above said disc on the side thereof remote from said hub, flanges extending beyond said parallel sides, and a slide movable back and forth in said slot and retained therein by said flanges during rotation of said disc relative to said slide, said disc having thereon a picture of a portion of the earth and a portion of the sky including the line common to said earth and sky portions whereby rotation of said disc relative to said slide creates the effect of a change in position of a picture on said slide relative to the earth, and a picture of a portion of an airplane on said slide, the portion of said slide not occupied by said airplane picture being transparent whereupon by sliding of said slide, additional changes in the relation of said airplane to said earth are created.

JOHN K. CHRISTIE.

REFERENCES CITED

The following references are of record in the file of this patent:

UNITED STATES PATENTS

| Number | Name | Date |
|---|---|---|
| 554,101 | Yaggy | Feb. 4, 1896 |
| 1,048,997 | Coe | Jan. 7, 1913 |
| 1,285,038 | Chance | Nov. 19, 1918 |
| 1,416,847 | Lewis | May 23, 1922 |
| 1,587,685 | Tillinghast | June 8, 1926 |
| 1,789,890 | Agrell | Jan. 20, 1931 |
| 1,835,777 | Hennegan | Dec. 8, 1931 |
| 1,873,595 | Johnson | Aug. 23, 1932 |
| 2,312,370 | Soule | Mar. 2, 1943 |
| 2,317,047 | Foote | Apr. 20, 1943 |
| 2,332,218 | Harris | Oct. 19, 1943 |
| 2,395,838 | Beishline | Mar. 5, 1946 |